(12) United States Patent
Shifman

(10) Patent No.: US 9,094,791 B2
(45) Date of Patent: Jul. 28, 2015

(54) METHOD FOR PROVIDING ON-DEMAND DIGITAL REPRESENTATIONS TO MOBILE DEVICES IN OTHER GEOGRAPHIC LOCATIONS

(71) Applicant: Ouri Shifman, Los Angeles, CA (US)

(72) Inventor: Ouri Shifman, Los Angeles, CA (US)

( * ) Notice: Subject to any disclaimer, the term of this patent is extended or adjusted under 35 U.S.C. 154(b) by 0 days.

(21) Appl. No.: 14/145,942

(22) Filed: Jan. 1, 2014

(65) Prior Publication Data

US 2015/0189466 A1    Jul. 2, 2015

(51) Int. Cl.
*H04W 64/00* (2009.01)
*H04W 4/02* (2009.01)

(52) U.S. Cl.
CPC ............. *H04W 4/02* (2013.01); *H04W 64/00* (2013.01)

(58) Field of Classification Search
CPC .................................................. H04M 1/72572
USPC ................... 455/457, 416, 456.6; 715/751; 348/14.02
See application file for complete search history.

(56) References Cited

U.S. PATENT DOCUMENTS

| | | | |
|---|---|---|---|
| 8,285,639 B2 | 10/2012 | Eden et al. | |
| 2006/0152592 A1 | 7/2006 | Chishima et al. | |
| 2009/0187492 A1 | 7/2009 | Hammad et al. | |
| 2010/0024017 A1 | 1/2010 | Ashfield et al. | |
| 2011/0035318 A1 | 2/2011 | Hargrove et al. | |
| 2011/0302504 A1* | 12/2011 | Khare et al. | 715/751 |
| 2012/0203663 A1 | 8/2012 | Sinclair et al. | |
| 2013/0030934 A1 | 1/2013 | Bakshi et al. | |
| 2013/0082103 A1 | 4/2013 | Aaron et al. | |
| 2013/0243250 A1 | 9/2013 | France et al. | |
| 2014/0250009 A1 | 9/2014 | Carlson | |
| 2015/0058125 A1 | 2/2015 | Moshfeghi | |

FOREIGN PATENT DOCUMENTS

KR           101046504            7/2014

* cited by examiner

*Primary Examiner* — Phuoc H Doan
(74) *Attorney, Agent, or Firm* — Mark M. Friedman

(57) ABSTRACT

A request is received from a mobile device located in a first geographic location for an image displaying a second geographic location. Mobile devices are geolocated and those located within a predetermined distance from the second geographic location are identified. A description of the desired image is delivered to each such identified such mobile device, whereupon the desired image is received from at least one such identified mobile device and forwarded to the requesting mobile device.

13 Claims, 3 Drawing Sheets

METHOD FOR PROVIDING ON-DEMAND DIGITAL REPRESENTATIONS TO MOBILE DEVICES IN OTHER GEOGRAPHIC LOCATIONS

FIELD AND BACKGROUND OF THE INVENTION

The present invention relates to method for providing on-demand digital representations to mobile devices in other geographic locations and, more particularly, to a method and system in which a mobile device user in one location can request and receive an image of a second location by submitting the request to a host computer which geolocates mobile devices in the second location and forwards a description of the requested image to mobile devices located within a predetermined distance of the second location.

SUMMARY OF THE INVENTION

According to the present invention there is provided a method for providing an on-demand digital representation of a geographic location including, at a host computer: (a) receiving from a requesting mobile device located in a first geographic location a request for a digital representation depicting a second geographic location; (b) geolocating a plurality of providing mobile devices and identifying a subset of the plurality of providing mobile devices which are located within a predetermined distance from the second geographic location; (c) delivering to at least one such identified providing mobile device a description of the requested digital representation; (d) receiving from at least one such identified providing mobile device a digital representation which satisfies the request; and (e) forwarding the received digital representation to the requesting mobile device.

Preferably the method includes: (f) if no digital representation is received in response to the delivering of the description, repeating steps (b) through (c) until a termination condition is satisfied, the termination condition including receipt of the digital representation or expiration of a deadline; (g) upon receiving the request from the requesting mobile device, performing a computerized search through a searchable collection of digital representations for a digital representation which satisfies the request; and (h) upon receiving the digital representation from one of the identified providing mobile devices, adding a copy of the received digital representation to a searchable collection of digital representations. Preferably the digital representation is a photograph depicting the second geographic location, or a video depicting the second geographic location.

According to the present invention there is further provided a non-transitory computer readable storage medium having computer readable code embodied thereon, the computer readable code for providing an on demand digital representation of a geographic location including: (a) program code for receiving from a requesting mobile device located in a first geographic location a request for a digital representation depicting a second geographic location; (b) program code for geolocating a plurality of providing mobile devices and identifying a subset of the plurality of providing mobile devices which are located within a predetermined distance from the second geographic location; (c) program code for delivering to at least one such identified providing mobile device a description of the requested digital representation; (d) program code for receiving from at least one such identified providing mobile device a digital representation which satisfies the request; and (e) program code for forwarding the received digital representation to the requesting mobile device.

Preferably the medium includes: (f) program code for: if no digital representation is received in response to the delivery, repeating steps (b) through (c) until a termination condition is satisfied; (g) program code for: upon receiving the request from the requesting mobile device, performing a computerized search through a searchable collection of digital representations for a digital representation which satisfies the request; and (h) program code for: upon receiving the digital representation from one of the identified providing mobile devices, adding a copy of the received digital representation to a searchable collection of digital representations.

According to the present invention there is further provided a non-transitory computer readable storage medium having computer readable code embodied thereon, the computer readable code for providing an on demand digital representation of a geographic location including: (a) program code for receiving from a host computer a request for a digital representation depicting a first geographic location located within a predetermined distance from a current location of the medium, the request originating from a requesting mobile device in a second geographic location; and (b) program code for sending to the host computer in response to the request a digital representation depicting the first geographic location which satisfies the request.

Preferably the medium includes: (c) program code for allowing a user to define a max distance for providing digital representations, and where the predetermined distance is the max distance as defined by the user.

According to the present invention there is further provided a server including: a processor and a non-volatile memory, operationally coupled to the processor, on which is stored executable code readable by the processor, the code including instructions that when executed by the processor causes the server to provide an on demand digital representation of a geographical location by: (a) receiving from a requesting mobile device located in a first geographic location a request for a digital representation depicting a second geographic location; (b) geolocating a plurality of providing mobile devices and identifying a subset of the plurality of providing mobile devices which are located within a predetermined distance from the second geographic location; (c) delivering to at least one such identified providing mobile device a description of the requested digital representation; (d) responsive to the delivering of the description, receiving from at least one such identified providing mobile device a digital representation which satisfies the request; and (e) forwarding the received digital representation to the requesting mobile device.

Preferably the code includes instructions for: (f) if no digital representation is received in response to the delivery, repeating steps (b) through (c) until a termination condition is satisfied; (g) upon receiving the request from the requesting mobile device, performing a computerized search through a searchable collection of digital representations for a digital representation which satisfies the request; and (h) upon receiving the digital representation from one of the identified providing mobile devices, adding a copy of the received digital representation to a searchable collection of digital representations.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a method and system for on demand digital representations to mobile devices in other geographic locations according to the present invention may be better understood with reference to the drawings and the accompanying description.

Figure 1:
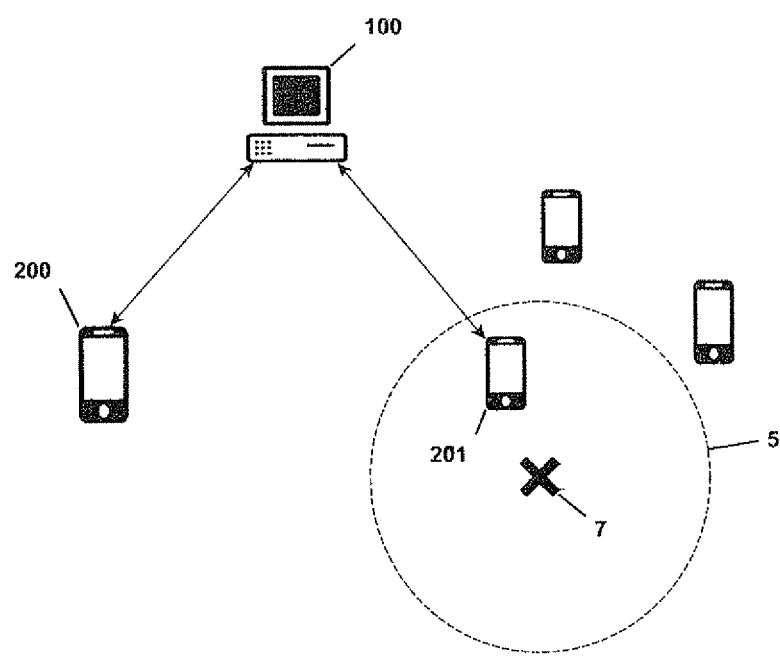
FIG. 1 is a high level diagram illustrating the present invention.

Referring now to FIG. 1, a user operating a User Equipment (UE) 200 sends a request to a host computer 100 for a location-specific photo or video, including a description of the target object or location. By "location-specific" we mean the object of the photo or video is a specific location or target object. Preferably UE 200 is a mobile computing device such as a smartphone, tablet, laptop, PDA, etc. Preferably UE 200 has an attached camera for capturing photo and video. Preferably UE 200 is capable of being geolocated by host computer 100. Methods of geolocating mobile devices such as UE 200 are well known in the art. For example, a mobile device may be geolocated by a host computer using the mobile device's integrated GPS receiver, by triangulation techniques which measure cell phone transmissions to nearby base station antennae, or by the mobile device's Internet IP address and/or communications with wireless access points, or other known methods.

Host computer 100 receives a request for an image of a target object (or location) 7 from UE 200. "Image" can be either a still image or a moving image, i.e. video. In one embodiment the request can also include details of the image sought, for example the viewing angle, distance, time-frame, number of images or any other specific requests. Host computer 100 locates one or more mobile cameras 201 within a predetermined distance 5 from target object/location 7. In a preferred embodiment, mobile camera 201 is a UE with an integrated camera such as a smartphone, however any camera capable of receiving requests for images is contemplated within the present invention. Mobile camera 201 captures the requested image and sends it to host computer 100. Host computer 100 forwards the image, or a download link thereto, to UE 200.

Figure 2:
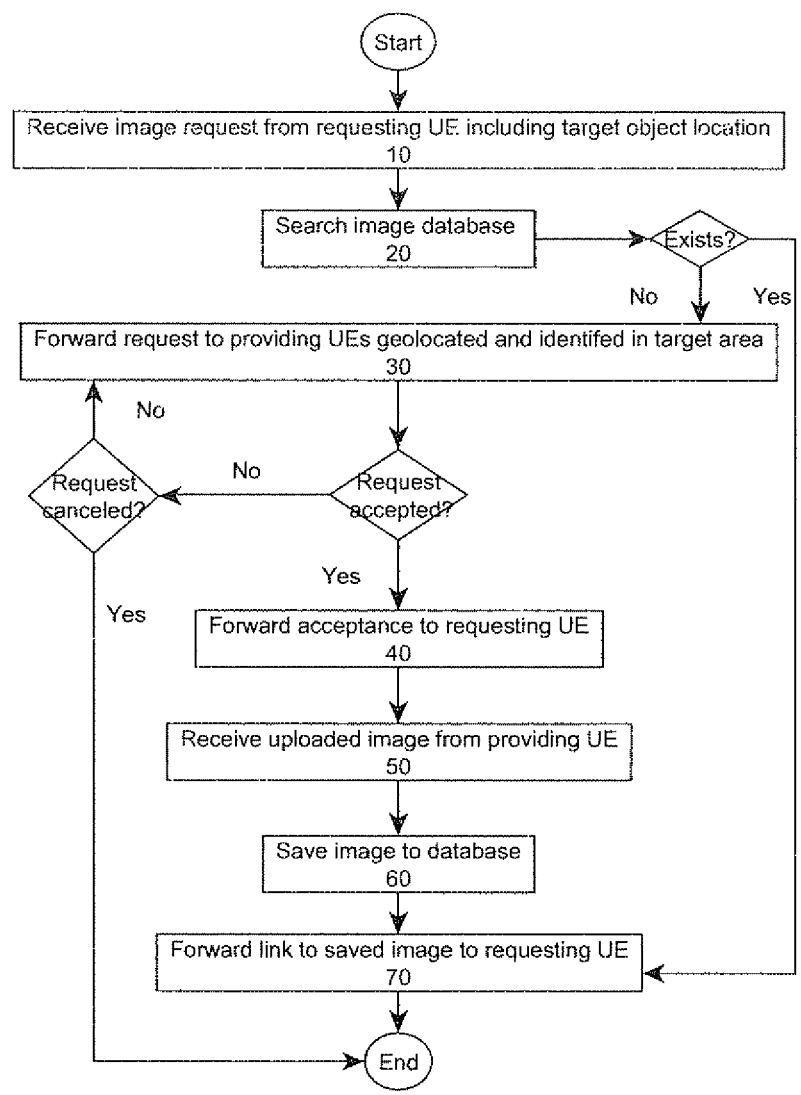
FIG. 2 is a flow chart illustrating an exemplary method of implementing the present invention on a host computer.

FIG. 2 describes an exemplary method performed on a host computer such as host computer 100 of FIG. 1 according to a preferred embodiment of the present invention. First, a request for an image is received 10 from a user through a requesting UE (such as UE 200 in FIG. 1). In one embodiment a map is displayed for the requesting user on the requesting UE, and the requesting user selects (for example by tapping on a touch screen) a location on the map in order to describe the target location of the request. In another embodiment the users describes the location with keywords (e.g. Eiffel Tower) or location (e.g. corner of Fifth and Main), in which case the keywords should describe the location with sufficient detail so as to allow the host computer to identify the target object/location with reasonably accuracy. If a location is selected on a map, the location coordinates corresponding to the selected region are transmitted to the host computer. If keywords are entered, the host computer may need to translate the target object/location described to corresponding geographical location coordinates. Next, in a preferred embodiment a searchable image database (which can be local or remote) is searched 20 for images tagged with keywords and/or location coordinates matching the target object/location, and any other specific details as may be provided in the request. If a matching image is found, a download link for downloading the image is generated and forwarded 70 to the requesting UE.

If no match is found, a fulfillment request including a description of the required image and any specific details of the image sought is sent 30 to one or more available providing UE (such as mobile camera 201 in FIG. 1) which are determined by geolocation to be located within the predetermined distance from the target object/location. In one embodiment, the predetermined distance is set globally by the host computer. In another embodiment, the predetermined distance is individually set by a providing UE prior to receiving requests for images, for example by indicating in a user settings screen on the UE the maximum distance the user of the providing UE is willing to travel to an object or location in order to capture an image for a requesting UE. In yet another embodiment, the predetermined distance is specified by requesting UE in the request. Preferably, UE are continually (or periodically at regular predetermined intervals) geolocated in order to identify suitably located providing UE, to which a fulfillment request is then sent. Preferably the above steps are repeated until the desired image is acquired or the request is canceled. The request may be canceled by the requesting UE or by the host computer in the case where repeat attempts to acquire an image in the above manner fail. In one embodiment the request may be automatically canceled after the expiration of a predetermined time limit or deadline for acquiring the image.

In a preferred embodiment, UE which intend to deliver the requested image send a confirmation to the host computer prior to either capturing or uploading an image. Preferably such confirmation indicates a willingness to fulfil the request rather than a commitment or obligation. Preferably, after having received at least one such confirmation from at least one UE, host computer sends 40 the requesting UE notice of having received such confirmation. After having received the first confirmation, the host computer may or may not continue to send fulfillment requests to identified providing UE.

Next, a providing UE captures the requested image and uploads the captured image to the host computer. The host computer receives 50 the uploaded image, tags it using location coordinates and/or searchable keywords and saves 60 the received image to a searchable image database. Finally, the host computer sends 70 to the requesting UE a download link to the saved image.

Figure 3:
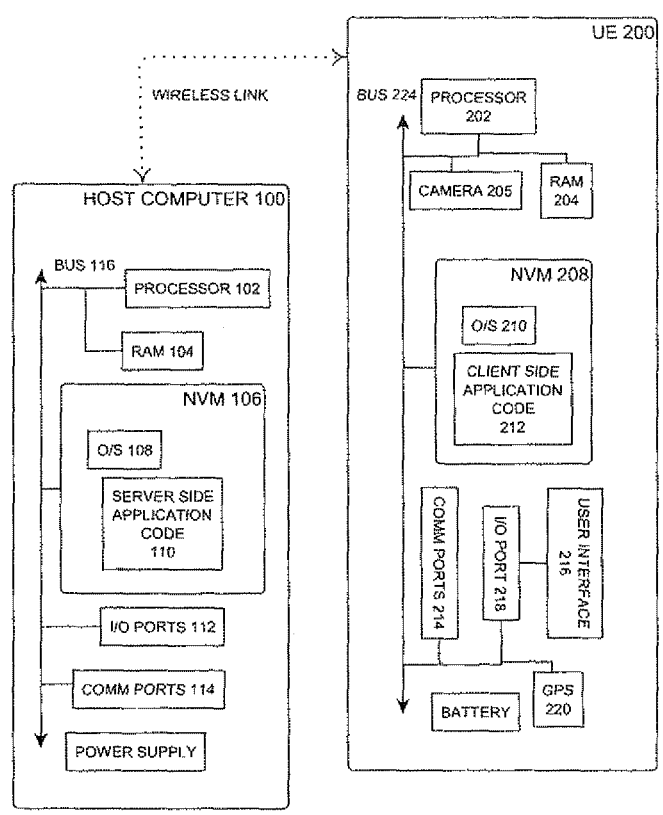
FIG. 3 is a high level partial block diagram of an exemplary host computer and UE which are configured for the present invention.

FIG. 3 is a high-level partial block diagram of an exemplary host computer 100 and UE 200 which are configured to implement the present invention. Only components of host computer 100 and UE 200 that are germane to the present invention are shown in FIG. 3. In FIG. 3, UE 200 is configured to perform the tasks of either a requesting UE or a providing UE.

Host computer 100 includes one or more processors 102, a random access memory (RAM) 104, a non-volatile Memory (NVM) 106, communication ports 114, and input/output (I/O) ports 112 all communicating with each other via a common bus 116.

In NVM 106 are stored operating system (O/S) code 108 and server-side application code 110. Server-side application code 110 includes computer readable executable code for implementing the host computer functions of the present invention such as those described above. Under the control of O/S 108, processor 102 loads server side application code 110 from NVM 106 into RAM 104 and executes server-side application code 110 in RAM 104, causing host computer 100 to perform host computer functions for providing on demand photos and videos to mobile devices as described above.

UE 200 includes one or more processors 202, a random access memory (RAM) 204, a non-volatile memory (NVM) 208, a camera 205, communication ports 214, and an input/output (I/O) port 218 all communicating with each other via a common bus 224. I/O port 218 is in operative communication with a user interface 216 to display output (for example on a display screen) and receive input (for example through a touch capacitive display screen). UE 200 may optionally include a geolocation receiver such as a GPS receiver 220. In NVM 208 are stored operating system (O/S) code 210 and client-side application code 212. Client-side application code 212 includes computer readable executable code for implementing the UE functions of the present invention such as those described above. Under the control of O/S 210, processor 202 loads client-side application code 212 from NVM 208 into RAM 204 and executes client-side application code 212 in RAM 204 causing UE 200 to perform UE functions for requesting and providing on demand photos and videos to mobile devices as described above.

While the invention has been described with respect to a limited number of embodiments, it will be appreciated that many variations, modifications and other applications of the invention may be made. Therefore, the invention as recited in the claims that follow is not limited to the embodiments described herein.

What is claimed is:

1. A method of providing an on-demand digital representation of a geographic location at a host computer, comprising:
   (a) receiving, from a requesting mobile device located in a first geographic location request for a digital representation depicting a second geographic location;
   (b) geolocating a plurality of providing mobile devices and identifying a subset of said plurality of providing mobile devices which are located within a predetermined distance from said second geographic location;
   (c) delivering to at least one such identified providing mobile device a description of said requested digital representation;
   (d) responsive to said delivering of said description, receiving from at least one such identified providing mobile device a digital representation which satisfies said request;
   (e) forwarding said received digital representation to said requesting mobile device; and,
   (f) if no digital representation is received in response to said delivering of said description, repeating steps (b) through (c) until a termination condition is satisfied.

2. The method of claim 1, wherein said termination condition includes receipt of said digital representation.

3. The method of claim 1, wherein said termination condition includes expiration of a deadline.

4. The method of claim 1, further comprising:
   (g) upon receiving said request from said requesting mobile device, performing a computerized search through a searchable collection of digital representations for a digital representation which satisfies said request.

5. The method of claim 4, further comprising:
   (h) upon receiving said digital representation from one of said identified providing mobile devices, adding a copy of said received digital representation to a searchable collection of digital representations.

6. The method of claim 1, wherein said digital representation is a photograph depicting said second geographic location.

7. The method of claim 1, wherein said digital representation is a video depicting said second geographic location.

8. A non-transitory computer readable storage medium having computer readable code embodied thereon, the computer readable code for providing an on demand digital representation of a geographic location comprising:
   (a) program code for receiving, from a requesting mobile device located in a first geographic location, a request for a digital representation depicting a second geographic location;
   (b) program code for geolocating a plurality of providing mobile devices and identifying a subset of said plurality of providing mobile devices which are located within a predetermined distance from said second geographic location;
   (c) program code for delivering to at least one such identified providing mobile device a description of said requested digital representation;
   (d) program code for, responsive to said delivering of said description, receiving from at least one such identified providing mobile device said requested digital representation;
   (e) program code for forwarding said received digital representation to said requesting mobile device; and,
   (f) program code for: if no digital representation is received in response to said delivery, repeating steps (b) through (c) until a termination condition is satisfied.

9. The medium of claim 8, further comprising:
   (g) program code for: upon receiving said request from said requesting mobile device, performing a computerized search through a searchable collection of digital representations for a digital representation which satisfies said request.

10. The medium of claim 9, further comprising:
    (h) program code for: upon receiving said digital representation from one of said identified providing mobile devices, adding a copy of said received digital representation to a searchable collection of digital representations.

11. A server comprising:
    a processor; and,
    a non-volatile memory, operationally coupled to said processor, on which is stored executable code readable by said processor, said code including instructions that when executed by said processor causes the server to provide an on demand digital representation of a geographical location by:
    (a) receiving, from a requesting mobile device located in a first geographic location, a request for a digital representation depicting a second geographic location;
    (b) geolocating a plurality of providing mobile devices and identifying a subset of said plurality of providing mobile devices which are located within a predetermined distance from said second geographic location;
    (c) delivering to at least one such identified providing mobile device a description of said requested digital representation;
    (d) responsive to said delivering of said description, receiving from at least one such identified providing mobile device a digital representation which satisfies said request;
    (e) forwarding said received digital representation to said requesting mobile device; and, (f) if no digital representation is received in response to said delivery, repeating steps (b) through (c) until a termination condition is satisfied.

12. The server of claim 11, wherein said code further includes instructions for:
(g) upon receiving said request from said requesting mobile device, performing a computerized search through a searchable collection of digital representations for a digital representation which satisfies said request.

13. The server of claim 12, wherein said code further includes instructions for:
(h) upon receiving said digital representation from one of said identified providing mobile devices, adding a copy of said received digital representation to a searchable collection of digital representations.

* * * * *

UNITED STATES PATENT AND TRADEMARK OFFICE
CERTIFICATE OF CORRECTION

| | | |
|---|---|---|
| PATENT NO. | : 9,094,791 B2 | Page 1 of 1 |
| APPLICATION NO. | : 14/145942 | |
| DATED | : July 28, 2015 | |
| INVENTOR(S) | : Shifman | |

It is certified that error appears in the above-identified patent and that said Letters Patent is hereby corrected as shown below:

In the claims:

Column 5 line 35 claim 1, should be corrected as follows:
Change
-- first geographic location request for digital --
to
"first geographic location, a request for digital"

Signed and Sealed this
Eighth Day of December, 2015

Michelle K. Lee
*Director of the United States Patent and Trademark Office*